United States Patent
Quintero

(10) Patent No.: US 6,838,485 B1
(45) Date of Patent: Jan. 4, 2005

(54) TREATMENTS FOR DRILL CUTTINGS

(75) Inventor: Lirio Quintero, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/691,589

(22) Filed: Oct. 18, 2000

Related U.S. Application Data

(63) Continuation-in-part of application No. 09/426,172, filed on Oct. 22, 1999, now Pat. No. 6,224,534.
(60) Provisional application No. 60/105,502, filed on Oct. 23, 1998.

(51) Int. Cl.$^7$ .......................... B01F 17/02; B01F 17/14; C11D 1/14; A62D 3/00
(52) U.S. Cl. ...................... 516/58; 588/250; 588/252; 428/402.2; 510/365
(58) Field of Search .................... 516/58; 588/250, 588/252, 259; 134/40; 175/66; 210/925; 507/136, 261

(56) References Cited

U.S. PATENT DOCUMENTS

| | | | | |
|---|---|---|---|---|
| 3,210,310 A | | 10/1965 | Holbert et al. ............... 523/130 |
| 3,389,110 A | * | 6/1968 | Taft ........................... 524/460 |
| 4,032,466 A | * | 6/1977 | Otrhalek et al. .............. 134/40 |
| 4,040,866 A | | 8/1977 | Mondshine .................. 134/26 |
| 4,209,381 A | | 6/1980 | Kelly, Jr. ..................... 134/19 |
| 4,395,357 A | | 7/1983 | Kramer et al. ............... 502/401 |
| 4,425,241 A | | 1/1984 | Swanson .................... 507/110 |
| 4,469,603 A | | 9/1984 | Lepain et al. ................ 210/749 |
| 4,480,702 A | | 11/1984 | Kelly, Jr. ..................... 175/66 |
| 4,554,081 A | | 11/1985 | Borchardt et al. .......... 507/121 |
| 4,597,893 A | | 7/1986 | Byford et al. ................ 516/59 |
| 4,599,117 A | | 7/1986 | Luxemburg ................ 134/25.1 |
| 4,600,515 A | | 7/1986 | Gleason et al. ............. 507/120 |
| 4,645,608 A | | 2/1987 | Rayborn ...................... 507/128 |
| 4,649,183 A | | 3/1987 | McCormick et al. ....... 526/240 |
| 4,812,242 A | | 3/1989 | James et al. ................. 210/735 |
| 4,861,499 A | | 8/1989 | Neff et al. .................... 507/225 |
| 4,892,916 A | | 1/1990 | Hawe et al. ................. 526/304 |
| 5,005,655 A | | 4/1991 | Stokke et al. ................. 175/66 |
| 5,076,938 A | | 12/1991 | Noonan et al. ............. 210/708 |
| 5,156,686 A | | 10/1992 | Van Slyke .................... 134/26 |
| 5,192,460 A | * | 3/1993 | Thomas et al. ............. 510/238 |
| 5,213,625 A | | 5/1993 | Van Slyke .................... 134/26 |
| 5,286,403 A | * | 2/1994 | O'Dwyer et al. ........... 510/424 |
| 5,402,857 A | | 4/1995 | Dietzen ........................ 175/66 |
| 5,405,223 A | | 4/1995 | Sirevag ...................... 405/128 |
| 5,422,011 A | | 6/1995 | Avila .......................... 210/706 |
| 5,564,509 A | | 10/1996 | Dietzen ........................ 175/66 |
| 5,570,749 A | | 11/1996 | Reed ............................ 175/66 |
| 5,622,920 A | | 4/1997 | Rivas et al. ................. 507/232 |
| 5,678,238 A | * | 10/1997 | Billings et al. ............. 588/252 |
| 5,707,952 A | * | 1/1998 | Lambremont et al. ...... 510/362 |
| 5,792,223 A | | 8/1998 | Rivas et al. .................. 44/302 |
| 5,839,521 A | | 11/1998 | Dietzen ........................ 175/66 |
| 5,882,524 A | | 3/1999 | Storey et al. ............... 210/712 |
| 6,267,716 B1 | * | 7/2001 | Quintero ..................... 588/252 |

FOREIGN PATENT DOCUMENTS

| | | |
|---|---|---|
| EP | 0 544 377 A1 | 6/1993 |
| EP | 0 728 826 A1 | 8/1996 |
| WO | WO 89/09091 | 10/1989 |

OTHER PUBLICATIONS

Hawley's Condensed Chemical Dictionary, Eleventh Edition, edited by Sax and Lewis, Sr. (Van Nostrand Reinhold Company, Ney York, NY, copyright 1987), 10–1989, p. 355.*

The Merck Index An Encyclopedia of Chemicals, Drugs, and Biologicals, Tenth Edition, (Merck & Co, Inc. Raway, NJ, 1983) p. 692, Jan. 17, 1984.*

* cited by examiner

*Primary Examiner*—Daniel S. Metzmaier
(74) *Attorney, Agent, or Firm*—The Morris Law Firm, P.C.

(57) ABSTRACT

An emulsifier composition for treating marine cuttings, preferably in situ, to convert free hydrocarbons to isolated hydrocarbons; drill cuttings treated with the emulsifier composition; droplets of the emulsified free hydrocarbons; drill cuttings further treated with encapsulating material; and, isolated hydrocarbons comprising encapsulated droplets of free hydrocarbons and emulsifier.

148 Claims, No Drawings

TREATMENTS FOR DRILL CUTTINGS

The present application is a continuation-in-part of U.S. application Ser. No. 09/426,172, filed Oct. 22, 1999, now U.S. Pat. No. 6,224,534, which claims priority under 35 U.S.C. 119(e) to provisional application Ser. No. 60/105,502, filed Oct. 23, 1998.

FIELD OF THE INVENTION

The present invention relates to an emulsifier composition for treating marine cuttings preferably drilled with invert emulsion drilling fluids to minimize the environmental impact of their discharge into the sea. The treated cuttings and associated hydrocarbons will disperse in the marine environment, eliminating the possibility of organic enrichment.

BACKGROUND OF THE INVENTION

During the drilling of oil and/or gas wells, a drill bit at the end of a rotating drill string, or at the end of a drill motor, is used to penetrate through geologic formations. During this operation, drilling mud is circulated through the drill string, out of the bit, and returned to the surface via the annular space between the drill pipe and the formation. Among other functions, the drilling mud provides a washing action to remove the formation cuttings from the wellbore. The mud returns to the surface along with entrained drill cuttings and typically flows through "shale shakers," desanders, desilters, hydrocyclones, centrifuges, and/or other known devices to separate the cuttings from the mud. The shale shaker(s), which typically sit above the mud storage area, essentially are screens that are used to separate the drill cuttings from the drilling mud. The drilling mud falls through the screens by gravity and the cuttings pass over the end of the screens.

Where drilling is offshore, the disposal of the drill cuttings after separation from the drilling mud can present a problem. The most economical way to dispose of the cuttings would be to simply discharge the cuttings back into the surrounding water. However, the cuttings may contain environmentally damaging "free hydrocarbons," defined herein as hydrocarbons derived either from the drilling mud, from the formation, or both. The potential for environmental contamination could be alleviated by transporting the cuttings to a disposal facility onshore; however, this would increase the cost of the drilling operation considerably, and would not necessarily improve the environmental performance of the drilling operation.

A typical approach to resolve the problem has been to minimize the toxicity of the base fluids used to make drilling muds, and more recently, to use base fluids which are more biodegradable. Unfortunately, this approach fails to prevent one type of damage that free hydrocarbons can inflict on a marine environment.

Free hydrocarbons are known to organically enrich marine sediment, which eventually causes oxygen depletion and destruction of the environment surrounding the depleted sediment. As with any other organic matter, hydrocarbons tend to break down or decompose in the presence of oxygen, forming carbon dioxide and water. Oxygen is a limiting resource for this reaction. Marine sediment typically has an oxygen content of only from about 2 to about 8 mg per liter of marine sediment. When drill cuttings containing a high concentration of hydrocarbons are discharged into marine waters and reach the sea floor, the oxygen available in the marine sediment rapidly is used to decompose the hydrocarbons. The resulting oxygen depletion very rapidly causes the marine sediment to become anoxic, creating an environment in which most benthic organisms cannot exist.

The potential for environmental damage could be reduced by treating the cuttings in situ before discharging the cuttings into marine waters. Methods are need for treating marine cuttings, preferably in situ, to reduce the quantity of hydrocarbons that will be accessible upon discharge to organically enrich marine sediment.

SUMMARY OF THE INVENTION

A composition comprising:
  a combination of non-ionic emulsifiers with anionic emulsifiers comprising a media sufficiently acidic to promote acid reactive polymerization, wherein
  said anionic emulsifiers are selected from the group consisting of alkane sulfates, alkane sulfonates, and phosphate esters; and,
  said non-ionic emulsifiers comprise polyoxyethylene alcohols.

DETAILED DESCRIPTION OF THE INVENTION

According to the present invention, marine cuttings are treated, preferably in situ, with an emulsifier composition to minimize their environmental impact upon discharge. The treatment forms a cutting mixture which will not result in oxygen depletion of marine sediment. In a preferred method, free hydrocarbons in the cuttings are converted into "isolated hydrocarbons," defined herein as hydrocarbons which are unavailable to organically enrich surrounding marine sediment in an amount sufficient to induce oxygen depletion of the marine sediment. For purposes of the present application, the term "oxygen depletion" is defined to mean depletion of oxygen in marine sediment to a level below that required to sustain a typical community of benthic aerobic organisms. Without limiting the invention, typical healthy marine sediments are believed to have an oxygen content of from about 2 mg $O_2$/liter to about 8 mg $O_2$/liter of sediment.

Isolated hydrocarbons may be formed in a number of ways, including but not necessarily limited to encapsulation of the free hydrocarbons with a suitable encapsulating material. In a preferred embodiment, isolated hydrocarbons are produced by encapsulating free hydrocarbons on cuttings with an encapsulating material which renders the hydrocarbons wholly or partially inaccessible to biological degradation for a prolonged period of time. In a preferred embodiment, hydrocarbons in the drilling mud are non-toxic and biodegradable, and the encapsulating material allows some release of the hydrocarbons into the surrounding seawater at a rate which is sufficiently low as to allow the microorganisms in the surrounding environment to degrade the hydrocarbons without oxygen depletion of the marine sediment.

Hydrocarbons released into the seawater are called "leachate." The quantity of leachate released over a given period of time is defined as a percentage of the total quantity of "oil on cuttings," or free hydrocarbons. In the laboratory, the isolated hydrocarbons are tested for leachate by placing them in actual or synthetic seawater and measuring the amount of "leachate" over a period of about 150 days. Preferably, isolated hydrocarbons, according to the present invention, permit leachate of 0.5% or less of free hydrocarbons, more preferably about 0.25% or less of free hydrocarbons, and most preferably about 0.05% or less of free hydrocarbons.

The drilled cuttings may be treated using any suitable system of equipment. After separation from the drilling mud, the contaminated cuttings typically pass through a holding bin into an inlet hopper. The cuttings preferably are treated directly in a batch mixer equipped with an appropriate inlet for the relevant solutions and an apparatus for low shear mixing, such as a paddle mixer.

In a preferred embodiment, the cuttings are sprayed with an emulsifying solution effective to transform the free hydrocarbons in the cuttings into an emulsion. The emulsion thereafter is treated with an encapsulating material to encapsulate the emulsified hydrocarbons, and the mixture of drill cuttings and encapsulated free hydrocarbons is released into marine waters where it disperses.

The composition of the emulsifying solution may vary depending upon the type of free hydrocarbons found in the drilling mud. The following emulsifiers have superior (a) environmental compatibility, and (b) produce a very stable emulsion. The emulsifying solution may be a blend of organic acids, inorganic acids, and emulsifiers. The emulsifier(s) may have any ionic nature, including non-ionic, anionic, and cationic. Preferred emulsifying solutions are as non-toxic as possible, and preferably are either non-ionic or a non-ionic/anionic blend (where the drilling mud comprises paraffins) or, a combination of at least a non-ionic surfactant and most preferably a non-ionic and an anionic emulsifier (where the drilling system does not comprise paraffins). Although the compounds called "emulsifiers" herein typically are referred to as surfactants, their function in the present invention is to act as emulsifiers. The emulsifying solution lowers the interfacial tension between the oil and water to produce a sufficiently small droplet size, from about 3 microns to about 20 microns, preferably about 10 microns or less in diameter.

Preferred emulsifying solutions comprise a sufficient amount of a relatively strong acid to lower the pH to of the solution to at least about 4, preferably to at least about 2 to about 3, and most preferably to about 1. Relatively strong acids include, but are not necessarily limited to phosphoric acid, hydrochloric acid, sulfuric acid, nitric acid, and the like. A preferred acid is phosphoric acid. The emulsifying solution preferably comprises from about 15 wt % to about 45 wt %, preferably about 20 wt % phosphoric acid; about 5 wt % to about 90 wt %, preferably about 65 wt % emulsifiers; and water.

In order to achieve the desired small droplet size, it is necessary to use emulsifiers with the correct hydrophilic/lipophilic balance (HLB). The required HLB will differ depending upon the oil being emulsified. Preferred non-ionic emulsifiers include, but are not necessarily limited to linear or branched polyoxyethylene alcohols, more preferably linear polyoxyethylene alcohols, comprising (a) from about 8 to about 30, preferably about 8 to about 20 carbon atoms, and (b) comprising about 3 to about 50 moles, most preferably about 3 to about 20 moles ethylene oxide. Most preferred non-ionic emulsifiers are linear polyoxyethylene alcohols having from about 13 to about 15 carbon atoms and comprising about 10 moles ethylene oxide. The following are preferred HLB's for non-ionic emulsifiers when the drilling mud contains the following oils: polyalphaolefins and paraffins—HLB 12.5; esters—HLB-15.4; synthetic iso-paraffins—HLB 10.9.

Blends of both non-ionic and anionic emulsifiers have been found to decrease droplet size in most instances. Where such a blend is used, a preferred ratio of non-ionic to anionic emulsifier is about 5/95 to about 95/5, preferably about 50/50 to about 85/15. Any suitable, non-toxic anionic emulsifier may be used in such blends. Preferred anionic emulsifiers include, but are not necessarily limited to those selected from the group consisting of: alkane sulfates, alkane sulfonates, and phosphate esters comprising about 8 to about 18 carbon atoms, preferably about 8 to about 12 carbon atoms.

The following are preferred emulsifying blends for use with the specified type of drilling muds. The drilling muds indicated by brand name are available from Baker Hughes INTEQ, and the brand name represents a proprietary trademark of Baker Hughes INTEQ:

A Most Preferred Emulsifying Blend For Use With A Drilling Mud Comprising Isomerized Olefins (SYN-TEQ) (Blend of Emulsifiers With HLB 12.5):

Secondary alkanesulfonate of sodium or Sodium octyl sulfate  26 wt %
C13/C15 linear alcohol ethoxylate with 10 moles of ethylene oxide  39 wt %
Water + Phosphoric acid (at 75%)  35 wt %
Ratio of (linear alcohol ethoxylate with 10 moles of EO) to (secondary alkanesulfonate of sodium or Sodium Octyl Sulfate) = 60:40
Ratio of active emulsifier to phosphoric acid = 3:23

For Use With a Drilling Mud Comprising Isomerized Olefins (SYN-TEQ) (Blend of Emulsifiers With HLB 12.5):

Secondary alkanesulfonate of sodium or Sodium octyl sulfate  9.75 wt %
Isodecyl alcohol ethoxylate with 6 moles of ethylene oxide  55.25 wt %
Water + Phosphoric acid (at 75%)  35 wt %
Ratio of (Isodecyl alcohol ethoxylate with 6 moles of EO) to (secondary alkanesulfonate of sodium or Sodium Octyl Sulfate) = 85:15
Ratio of active emulsifier to phosphoric acid = 3:23

For Use With an Ester-Containing Drilling Mud (Blend of Emulsifiers With HLB 15.4)

Sodium Octyl Sulfate  6.50 wt %
Oleyl alcohol ethoxylate with 20 moles of ethylene oxide  58.50 wt %
Water + Phosphoric acid (at 75%)  35 wt %
Ratio of (Oleyl alcohol ethoxylate with 20 moles of EO) to Sodium octyl sulfate = 90:10

For Use With a Paraffin-Containing Mud (PARA-TEQ) (Emulsifier With HLB 12.5)

Isodecyl alcohol ethoxylate with 6 moles of ethylene oxide  55.25 wt %
Secondary alkanesulfonate of sodium or sodium octyl sulfate  9.75 wt %
Water + Phosphoric acid (at 75%)  35 wt %

For Use With a Synthetic Isoparaffin-Containing Mud (Blend of Emulsifiers With HLB 10.9)

Isotridecyl ethoxylate with 3 moles of ethylene oxide (HLB 8)  32.5 wt %
Isotridecyl ethoxylate with 10 moles of ethylene oxide (HLB 13.8)  32.5 wt %
Water + Phosphoric acid (at 75%)  35 wt %
Ratio of Isotridecyl edioxylate with 3 moles of EO/Isotridecyl ethoxylate with 10 moles of EO = 50/50

An excess of the emulsifier solution is added to the cuttings, preferably in the inlet hopper. The amount of emulsifier added will depend upon the concentration of free hydrocarbons in the cuttings as measured by any suitable means, such as "retort," or distillation and measurement of the oil content. After addition of the emulsifying solution, the wt/wt ratio of emulsifying blend in the cuttings should be about 0.2 wt % to about 5 wt % for cuttings contaminated with from about 2 wt % to about 18 wt % free hydrocarbons, respectively. The cuttings and emulsifying solution may be agitated so that substantially all of the free hydrocarbons are removed from the cuttings and emulsified or dispersed in the emulsifier solution. Thereafter, the encapsulating material is added.

The encapsulating material may be substantially any encapsulating material that surrounds the emulsified hydrocarbon droplets and solidifies. Suitable encapsulating materials include, but are not necessarily limited to silicates and acid reactive microencapsulating materials. A preferred encapsulating material is a silicate solution.

A preferred silicate solution for forming the encapsulating material has the following composition:

| | |
|---|---|
| Potassium or Sodium Silicate | 33–58 wt % |
| Waterglass solution | 0.01 to 2.0 wt % |
| Aluminum Trihydrate | 0.01 to 2.0 wt % |
| Titanium | 0.01 to 2.0 wt % |
| Glycol | 1.0 to 4.0 wt % |
| Water | Balance |

The amount of silicate solution that is added to the emulsified solution preferably is about 1 to about 2 times the amount of emulsifying solution added.

The emulsifier rapidly and substantially completely disperses the free hydrocarbons in the cuttings into small droplets. Application of the silicate solution to the emulsified oil converts the emulsified oil into a thick gel, which can be water-washed off of the cuttings, leaving a substantially clean surface. When allowed to dry, the gel is even more amenable to subsequent removal by water-washing. Although the emulsified solution has a relatively low pH, of about 4 or less, preferably from about 2 to about 3, and most preferably about 1, the final product has a pH of from about 6 to about 7, preferably about 7.

Because the emulsifier removes hydrocarbons (hydrophobic materials) from the cuttings and because the emulsifying solution is very hydrophilic, the wettability of the cuttings is changed from oil wettable to water wettable. The more hydrophilic cuttings have less tendency to agglomerate, and tend to more widely disperse, both in the seawater as they travel toward the ocean floor, and eventually in the marine sediment.

The combination of (a) encapsulation of free hydrocarbons from the cuttings (which decreases accessibility to the hydrocarbons over time), and (b) change in the wettability of the cuttings from oil wet to water wet (which results in greater spatial dispersion of the hydrocarbons) greatly minimizes the organic load on the marine sediment and helps to prevent oxygen depletion.

Persons of skill in the art will appreciate that many modifications may be made to the embodiments described herein without departing from the spirit of the present invention. Accordingly, the embodiments described herein are illustrative only and are not intended to limit the scope of the present invention.

I claim:

1. A drill cutting treatment composition consisting essentially of:
    an emulsion consisting essentially of droplets consisting essentially of free hydrocarbons emulsified by a combination of non-ionic emulsifiers with anionic emulsifiers having an HLB effective to emulsify said free hydrocarbons and consisting essentially of media adapted to initiate acid reactive polymerization upon exposure to polymerizable silicate solution,
    said anionic emulsifiers are selected from the group consisting of alkane sulfates, alkane sulfonates, and phosphate esters; and,
    said non-ionic emulsifiers are selected from the group consisting of polyoxyethylene alcohols.

2. The composition of claim 1 wherein
    said alkane sulfates, alkane sulfonates, and phosphate esters have from about 8 to about 18 carbon atoms; and
    said polyoxyethylene alcohols are selected from the group consisting of polyoxyethylene alcohols having a carbon chain of about 8 to about 30 carbon atoms and having from about 3 to about 50 moles ethylene oxide.

3. The composition of claim 2 wherein said polyoxyethylene alcohols have from about 3 to about 20 moles ethylene oxide.

4. The composition of claim 3 wherein said combination comprises a blend of non-ionic emulsifer and anionic emulsifer at a ratio of about 50/50 wt % to about 85/15 wt %.

5. The composition of claim 2 wherein said polyoxyethylene alcohols are selected from the group consisting of linear polyoxyethylene alcohols, polyoxyethylene alcohols having about 10 moles ethylene oxide, and a combination thereof.

6. The composition of claim 2 wherein said combination comprises a blend of non-ionic emulsifier and anionic emulsifier at a ratio of about 50/50 wt % to about 85/15 wt %.

7. The composition of claim 1 wherein said polyoxyethylene alcohols have from about 13 to about 15 carbon atoms.

8. The composition of claim 7 wherein said polyoxyethylene alcohols have from about 3 to about 20 moles ethylene oxide.

9. The composition of claim 8 wherein said combination comprises a blend of non-ionic emulsifier and anionic emulsifier at a ratio of about 50/50 wt % to about 85/15 wt %.

10. The composition of claim 7 wherein said polyoxyethylene alcohols are selected from the group consisting of linear polyoxyethylene alcohols, polyoxyethylene alcohols having about 10 moles ethylene oxide, and a combination thereof.

11. The composition of claim 1 wherein said polyoxyethylene alcohols have from about 3 to about 20 moles ethylene oxide.

12. The composition of claim 11 wherein said combination comprises a blend of non-ionic emulsifier and anionic emulsifier at a ratio of about 50/50 wt % to about 85/15 wt %.

13. The composition of claim 1 wherein said polyoxyethylene alcohols are selected from the group consisting of linear polyoxyethylene alcohols, polyoxyethylene alcohols having about 10 moles ethylene oxide, and a combination thereof.

14. The composition of claim 1 wherein said combination comprises a blend of non-ionic emulsifier and anionic emulsifier at a ratio of about 50/50 wt % to about 85/15 wt %.

15. The composition of claim 14 having about 10 wt. % or less of said combination of non-ionic emulsifiers with anionic emulsifiers.

16. The composition of claim 1 wherein said alkane sulfates, alkane sulfonates, and phosphate esters have from about 8 to about 12 carbon atoms.

17. The composition of claim 1 wherein:
    said polyoxyethylene alcohols have from about 8 to about 18 carbon atoms; and, said polyoxyethylene alcohols are selected from the group consisting of polyoxyethylene alcohols having from about 3 to about 50 moles ethylene oxide.

18. A composition comprising:

drill cuttings; and, an emulsion comprising droplets comprising free hydrocarbons emulsified by a combination of non-ionic emulsifiers with anionic emulsifiers having an HLB effective to emulsify said free hydrocarbons, said emulsion further comprising media adapted to initiate acid reactive polymerization upon exposure to polymerizable silicate solution, wherein said anionic emulsifiers are selected from the group consisting of alkane sulfates, alkane sulfonates, and phosphate esters; and, said non-ionic emulsifiers are selected from the group consisting of polyoxyethylene alcohols.

19. The composition of claim 18 wherein said anionic emulsifiers comprise from about 8 to about 18 carbon atoms; and said polyoxyethylene alcohols are selected from the group consisting of polyoxyethylene alcohols having from about 8 to about 30 carbon atoms and having from about 3 to about 50 moles ethylene oxide.

20. The composition of claim 19 wherein said anionic emulsifiers comprise from about 13 to about 15 carbon atoms.

21. The composition of claim 20 wherein said anionic emulsifiers are selected from the group consisting of linear polyoxyethylene alcohols, polyoxyethylene alcohols comprising about 10 moles ethylene oxide, and a combination thereof.

22. The composition of claim 18 wherein said droplets have a diameter of from about 3 microns to about 20 microns.

23. The composition of claim 22 wherein said droplets have a diameter of from about 3 to about 10 microns.

24. A drill cutting treatment composition consisting essentially of:

droplets consisting essentially of free hydrocarbons and an emulsifier combination of non-ionic emulsifiers and anionic emulsifiers, said droplets being encapsulated by silicates;

wherein said anionic emulsifiers are selected from the group consisting of alkane sulfates, alkane sulfonates, and phosphate esters; and, said non-ionic emulsifiers are selected from the group consisting of polyoxyethylene alcohols.

25. The composition of claim 24 wherein said anionic emulsifiers have from about 8 to about 18 carbon atoms; and said polyoxyethylene alcohols have from about 8 to about 30 carbon atoms and from about 3 to about 50 moles ethylene oxide.

26. The composition of claim 25 wherein said polyoxyethylene alcohols have from about 3 to about 20 moles ethylene oxide.

27. The composition of claim 24 wherein said polyoxyethylene alcohols have from about 13 to about 15 carbon atoms.

28. The composition of claim 27 wherein said polyoxyethylene alcohols have from about 3 to about 20 moles ethylene oxide.

29. The composition of claim 28 wherein said combination have a blend of non-ionic emulsifier and anionic emulsifiers at a ratio of about 50/50 to about 85/15.

30. The composition of claim 28 having a pH of about 4 or less.

31. The composition of claim 27 wherein said polyoxyethylene alcohols are selected from the group consisting of linear polyoxyethylene alcohols, polyoxyethylene alcohols having about 10 moles ethylene oxide, and a combination thereof.

32. The composition of claim 24 wherein said polyoxyethylene alcohols are selected from the group consisting of linear polyoxyethylene alcohols, polyoxyethylene alcohols having about 10 moles ethylene oxide, and a combination thereof.

33. The composition of claim 24 wherein said combination have a blend of non-ionic emulsifier and anionic emulsifiers at a ratio of about 50/50 to about 85/15.

34. The composition of claim 24 having a pH of about 4 or less.

35. The A composition of claim 24 wherein said droplets encapsulated by silicate maintain a leachate of about 0.5% or less of said quantity of free hydrocarbon.

36. The composition of claim 35 wherein said leachate is about 0.25% or less of said quantity of free hydrocarbon.

37. The composition of claim 35 wherein said leachate is about 0.05% or less of said quantity of free hydrocarbon.

38. A drill cutting treatment composition consisting essentially of:

a combination of non-ionic emulsifies with anionic emulsifiers having an HLB, effective to produce an emulsion consisting essentially of free hydrocarbon droplets, said combination further consisting essentially of media adapted to initiate acid reactive polymerization upon exposure to polymerizable silicate solution thereby encapsulating said free hydrocarbon droplets; wherein said anionic emulsifiers are selected from the group consisting of alkane sulfates, alkane sulfonates, and phosphate esters; and, said non-ionic emulsifiers are selected from the group consisting of polyoxyethylene alcohols.

39. The composition of claim 38 wherein said alkane sulfates, alkane sulfonates, and phosphate esters have a carbon chain having from about 8 lo about 18 carbon atoms; and said polyoxyethylene alcohols are selected from the group consisting of polyoxyethylene alcohols having a carbon chain of about 8 to about 30 carbon atoms and having from about 3 to about 50 moles ethylene oxide.

40. The composition of claim 39 wherein said polyoxyethylene alcohols are selected from the group consisting of polyoxyethylene alcohols having from about 3 to about 20 moles ethylene oxide.

41. The composition of claim 40 wherein said non-ionic emulsifier is at a weight ratio to said anionic emulsifier of about 50/50 to about 85/15.

42. The composition of claim 39 wherein said polyoxyethylene alcohols are selected from the group consisting of linear polyoxyethylene alcohols, polyoxyethylene alcohols having about 10 moles ethylene oxide, and a combination thereof.

43. The composition of claim 39 wherein said non-ionic emulsifier is at a weight ratio to said anionic emulsifier of about 50/50 to about 85/15.

44. The composition of claim 38 wherein said polyoxyethylene alcohols are selected from the group consisting of polyoxyethylene alcohols having from about 13 to about 15 carbon atoms.

45. The composition of claim 44 wherein said polyoxyethylene alcohols are selected from the group consisting of polyoxyethylene alcohols having from about 3 to about 20 moles ethylene oxide.

46. The composition of claim 45 wherein said non-ionic emulsifier is at a weight ratio to said anionic emulsifier of about 50/50 to about 85/15.

47. The composition of claim 45 wherein said alkane sulfates, alkane sulfonates, and phosphate esters have from about 8 to about 12 carbon atoms.

48. The composition of claim 44 wherein said polyoxyethylene alcohols are selected from the group consisting of linear polyoxyethylene alcohols, polyoxyethylene alcohols having about 10 moles ethylene oxide, and a combination thereof.

49. The composition of claim 48 wherein said non-ionic emulsifier is at a weight ratio to said anionic emulsifier of about 50/50 to about 85/15.

50. The composition of claim 44 wherein said alkane sulfates, alkane sulfonates, and phosphate esters have from about 8 to about 12 carbon atoms.

51. The composition of claim 38 wherein said polyoxyethylene alcohols are selected from the group consisting of polyoxyethylene alcohols having from about 3 to about 20 moles ethylene oxide.

52. The composition of claim 51 wherein said non-ionic emulsifier is at a weight ratio to said anionic emulsifier of about 50/50 to about 85/15.

53. The composition of claim 51 wherein said alkane sulfates, alkane sulfonates, and phosphate esters have from about 8 to about 12 carbon atoms.

54. The composition of claim 38 wherein said polyoxyethylene alcohols are selected from the group consisting of linear polyoxyethylene alcohols, polyoxyethylene alcohols having about 10 moles ethylene oxide, and a combination thereof.

55. The composition of claim 54 wherein said droplets are encapsulated by an encapsulating material.

56. The composition of claim 38 wherein said non-ionic emulsifier is at a weight ratio to said anionic emulsifier of about 50/50 to about 85/15.

57. The composition of claim 56 wherein said droplets are encapsulated by an encapsulating material.

58. The composition of claim 56 comprising about 10 wt. % or less of said combination of non-ionic emulsifiers with anionic emulsifiers.

59. The composition of claim 38 wherein said droplets are encapsulated by an encapsulating material.

60. The composition of claim 38 wherein said alkane sulfates, alkane sulfonates, and phosphate esters have from about 8 to about 12 carbon atoms.

61. A composition consisting essentially of:
  drill cuttings; and,
  an emulsion consisting essentially of droplets consisting essentially of free hydrocarbons emulsified by a combination of non-ionic emulsifier with anionic emulsifiers having an HLB effective to emulsify said free hydrocarbons, said emulsion consisting essentially of media adapted to initiate acid reactive polymerization upon exposure to polymerizable silicate solution,
  wherein
  said anionic emulsifiers are selected from the group consisting of alkane sulfates, alkane sulfonates, and phosphate esters; and,
  said non-ionic emulsifiers are selected from the group consisting of polyoxyethylene alcohols.

62. The composition of claim 61 wherein
  said alkane sulfate, alkane sulfonates, and phosphate esters have from about 8 to about 18 carbon atoms; and
  said polyoxyethylene alcohols are selected from the group consisting of polyoxyethylene alcohols having a carbon chain of about 8 to about 30 carbon atoms and having from about 3 to about 50 moles ethylene oxide.

63. The composition of claim 62 wherein said polyoxyethylene alcohols are selected from the group consisting of polyoxyethylene alcohols having from about 13 to about 15 carbon atoms.

64. The composition of claim 63 wherein said polyoxyethylene alcohols are selected from the group consisting of linear polyoxyethylene alcohols, polyoxyethylene alcohols having about 10 moles ethylene oxide, and combinations thereof.

65. The composition of claim 64 wherein said droplets have a diameter of from about 3 microns to about 20 microns.

66. The composition of claim 65 wherein said droplets have a diameter of from about 3 microns to about 10 microns.

67. The composition of claim 61 wherein said droplets have a diameter of from about 3 microns to about 20 microns.

68. The composition of claim 67 wherein said droplets have a diameter of from about 3 microns to about 10 microns.

69. A composition for emulsifying free hydrocarbons in drill cuttings obtained using a drilling fluid comprising isomerized olefins, said composition consisting essentially of:
  a combination of non-ionic emulsifiers and anionic emulsifiers, said combination having an HLB of about 12.5, said anionic emulsifiers being selected from the group consisting of alkane sulfates, alkane sulfonates, and phosphate esters and said non-ionic emulsifiers being selected from the group consisting of polyoxyethylene alcohols; and,
  media adapted to initiate polymerization upon exposure to polymerizable silicate solution.

70. The composition of claim 69 wherein said media consists essentially of an aqueous solution of phosphoric acid.

71. The composition of claim 70 wherein said aqueous solution of phosphoric acid is about 75 wt % phosphoric acid.

72. The composition of claim 71 wherein said combination of non-ionic emulsifiers and anionic emulsifiers is at a weight ratio to said aqueous solution of phosphoric acid of about of 3:23.

73. The composition of claim 72 wherein said non-ionic emulsifiers are selected from the group consisting of linear alcohol ethoxylates having about 13 to about 15 carbon atoms with about 10 moles of ethylene oxide.

74. The composition of claim 72 wherein said anionic emulsifiers are selected from the group consisting of secondary alkanesulfonates of sodium and sodium octyl sulfates.

75. The composition of claim 72 wherein said non-ionic emulsifiers are at a weight ratio of about 60:40 linear alcohol ethoxylate with 10 moles of ethylene oxide to said anionic emulsifiers selected from the group consisting of secondary alkanesulfonates of sodium and sodium octyl sulfite.

76. The composition of claim 72 wherein said non-ionic emulsifier is isodecyl alcohol ethoxylate with about 6 moles of ethylene oxide.

77. The composition of claim 72 wherein said non-ionic emulsifiers are at a weight ratio of about 85:15 isodecyl alcohol ethoxylate with 6 moles of ethylene oxide to said anionic emulsifiers selected from the group consisting of secondary alkanesulfonates of sodium and sodium octyl sulfate.

78. The composition of claim 71 wherein said polyoxyethylene alcohols have about 10 moles of ethylene oxide and from about 13 to about 15 carbon atoms.

79. The composition of claim 71 wherein said anionic emulsifiers are selected from the group consisting of secondary alkanesulfonates of sodium and sodium octyl sulfate.

80. The composition of claim 71 wherein said non-ionic emulsifiers are at a weight ratio of about 60:40 linear alcohol ethoxylate with 10 moles of ethylene oxide to said anionic emulsifiers selected from the group consisting of secondary alkanesulfonates of sodium and sodium octyl sulfate.

81. The composition of claim 71 wherein said non-ionic emulsifier is isodecyl alcohol ethoxylate with about 6 moles of ethylene oxide.

82. The composition of claim 71 wherein said non-ionic emulsifiers are at a weight ratio of about 85:15 isodecyl alcohol ethoxylate with 6 moles of ethylene oxide to said anionic emulsifiers selected from the group consisting of secondary alkanesulfonates of sodium and sodium octyl sulfate.

83. The composition of claim 70 wherein said combination of non-ionic emulsifiers and anionic emulsifiers is at a weight ratio to said aqueous solution of phosphoric acid of about of 3:23.

84. The composition of claim 83 wherein said non-ionic emulsifiers have about 13 to about 15 carbon atoms of linear alcohol ethoxylate with about 10 moles of ethylene oxide.

85. The composition of claim 83 wherein said anionic emulsifiers have selected from the group consisting of secondary alkanesulfonates of sodium and sodium octyl sulfate.

86. The composition of claim 83 wherein said non-ionic emulsifier is isodecyl alcohol ethoxylate with about 6 moles of ethylene oxide.

87. The composition of claim 70 wherein said polyoxyethylene alcohols have from about 13 to about 15 carbon atoms and about 10 moles of ethylene oxide.

88. The composition of claim 70 wherein said anionic emulsifiers are selected from the group consisting of secondary alkanesulfonates of sodium and sodium octyl sulfate.

89. The composition of claim 70 wherein said non-ionic emulsifiers are at a weight ratio of about 60:40 linear alcohol ethoxylate with 10 moles of ethylene oxide to said anionic emulsifiers selected from the group consisting of secondary alkansulfonates of sodium and sodium octyl sulfate.

90. The composition of claim 70 wherein said non-ionic emulsifier is isodecyl alcohol ethoxylate with about 6 moles of ethylene oxide.

91. The composition of claim 70 wherein said non-iconic emulsifiers are at a weight ratio of about 85:15 isodecyl alcohol ethoxylate with 6 moles of ethylene oxide to said anionic emulsifiers selected from the group consisting of secondary alkanesulfonates of sodium and sodium octyl sulfate.

92. The composition of claim 69 wherein said non-ionic emulsifiers have from about 13 to about 15 carbon atoms of linear alcohol ethoxylate with about 10 moles of ethylene oxide.

93. The composition of claim 69 wherein said anionic emulsifiers are selected from the group consisting of secondary alkanesulfonates of sodium and sodium octyl sulfate.

94. The composition of claim 69 wherein said non-ionic emulsifiers are at a weight ratio of about 60:40 linear alcohol ethoxylate with 10 moles of ethylene oxide to said anionic emulsifiers selected from the group consisting of secondary alkanesulfonates of sodium and sodium octyl sulfate.

95. The composition of claim 69 wherein said non-ionic emulsifier is isodecyl alcohol ethoxylate with about 6 moles of ethylene oxide.

96. The composition of claim 69 wherein said non-ionic emulsifiers are at a weight ratio of about 85:15 isodecyl alcohol ethoxylate with 6 moles of ethylene oxide to said anionic emulsifiers selected form the group consisting of secondary alkanesulfonates of sodium and sodium octyl sulfate.

97. A composition for emulsifying free hydrocarbons in drill cuttings obtained using a drilling fluid comprising esters, said composition consisting essentially of:
  a combination of non-ionic emulsifiers and anionic emulsifiers, said combination having an HLB of about 15.4, said anionic emulsifiers being selected from the group consisting of alkane sulfates, alkane sulfonates, and phosphate esters and said non-ionic emulsifiers selected from the group consisting of polyoxyethylene alcohols; and,
  media adapted to initiate polymerization of a polymerizable silicate solution.

98. The composition of claim 97 wherein said media consists essentially of an aqueous solution of phosphoric acid.

99. The composition of claim 98 wherein said aqueous solution of phosphoric acid has about 75 wt % phosphoric acid.

100. The composition of claim 99 wherein said non-ionic emulsifier is oleyl alcohol ethoxylate with about 20 moles of ethylene oxide.

101. The composition of claim 99 wherein said anionic emulsifier is sodium octyl sulfate.

102. The composition of claim 99 wherein said non-ionic emulsifiers are at a weight ratio of about 90:10 to said anionic emulsifiers, said non-ionic emulsifier being oleyl alcohol ethoxylate with about 20 moles of ethylene oxide and said anionic emulsifier being sodium octyl sulfate.

103. The composition of claim 98 wherein said non-ionic emulsifier is oleyl alcohol ethoxylate with about 20 moles of ethylene oxide.

104. The composition of claim 98 wherein said anionic emulsifier is sodium octyl sulfate.

105. The composition of claim 98 wherein said non-ionic emulsifiers are at a weight ratio of about 90:10 to said anionic emulsifiers, said non-ionic emulsifier being oleyl alcohol ethoxylate with about 20 moles of ethylene oxide and said anionic emulsifier being sodium octyl sulfate.

106. The composition of claim 97 wherein said non-ionic emulsifiers are selected from the group consisting of oleyl alcohol ethoxylates with about 20 moles ethylene oxide.

107. The composition of claim 97 wherein said anionic emulsifier is sodium octyl sulfate.

108. The composition of claim 97 wherein said non-ionic emulsifiers are at a weight ratio of about 90:10 to said anionic emulsifiers, said non-ionic emulsifier being oleyl alcohol ethoxylate with about 20 moles of ethylene oxide and said anionic emulsifier being sodium octyl sulfate.

109. A composition for emulsifying free hydrocarbons in drill cuttings obtained using a drilling fluid comprising paraffin-containing mud, said composition consisting essentially of:
  a combination of non-ionic emulsifiers and anionic emulsifiers, said combination having an HLB of about 12.5, said anionic emulsifiers being selected from the group consisting of alkane sulfates, alkane sulfonates, and phosphate esters and said non-ionic emulsifiers being selected from the group consisting of polyoxyethylene alcohols; and, media adapted to initiate polymerization upon exposure to polymerizable silicate solution.

110. The composition of claim 109 wherein said media consist essentially of an aqueous solution of phosphoric acid.

111. The composition of claim 110 wherein said aqueous solution of phosphoric acid has about 75 wt % phosphoric acid.

112. The composition of claim 111 wherein said non-ionic emulsifier is isodecyl alcohol ethoxylate with about 6 moles of ethylene oxide.

113. The composition of claim 111 wherein said anionic emulsifier is selected from the group consisting of secondary alkanesulfonates of sodium and sodium octyl sulfate.

114. The composition of claim 110 wherein said non-ionic emulsifier is isodecyl alcohol ethoxylate with about 6 moles of ethylene oxide.

115. The composition of claim 110 wherein said anionic emulsifier is selected from the group consisting of secondary alkanesulfonates of sodium and sodium octyl sulfate.

116. The composition of claim 109 wherein said non-ionic emulsifier is isodecyl alcohol ethoxylate with about 6 moles of ethylene oxide.

117. The composition of claim 109 wherein said anionic emulsifier is selected from the group consisting of secondary alkanesulfonates of sodium and sodium octyl sulfate.

118. The composition of emulsifying free hydrocarbons in drill cuttings obtained using a drilling fluid comprising synthetic isoparaffin-containing mud, said composition consisting essentially of:

one or more non-ionic emulsifiers having an HLB of about 10.9, said non-ionic emulsifiers being selected from the group consisting of polyoxyethylene alcohols; and, media adapted to initiate polymerization upon exposure to polymerizable silicate solution.

119. The composition of claim 118 wherein said media consist essentially of an aqueous solution of phosphoric acid.

120. The composition of claim 119 wherein said aqueous solution of phosphoric acid has about 75 wt % phosphoric acid.

121. The composition of claim 120 wherein said non-ionic emulsifier is isotridecyl ethoxylate with about 3 moles of ethylene oxide.

122. The composition of claim 120 wherein said non-ionic emulsifier is isotridecyl ethoxylate with about 10 moles of ethylene oxide.

123. The composition of claim 120 wherein said non-ionic emulsifiers are at a weight ratio of about 50:50 isotridecyl ethoxylate with about 3 moles of ethylene oxide to isotridecyl ethoxylate with about 10 moles of ethylene oxide.

124. The composition of claim 119 wherein said non-ionic emulsifier is isotridecyl ethoxylate with about 3 moles of ethylene oxide.

125. The composition of claim 119 wherein said non-ionic emulsifier is isotridecyl ethoxylate with about 10 moles of ethylene oxide.

126. The composition of claim 119 wherein said non-ionic emulsifiers are at a weight ratio of about 50:50 isotridecyl ethoxylate with about 3 moles of ethylene oxide to isotridecyl ethoxylate with about 10 moles of ethylene oxide.

127. The composition of claim 118 wherein said non-ionic emulsifier is isotridecyl ethoxylate with about 3 moles of ethylene oxide.

128. The composition of claim 118 wherein said non-ionic emulsifier is isotridecyl ethoxylate with about 10 moles of ethylene oxide.

129. The composition of claim 118 wherein said non-ionic emulsifiers are at a weight ratio of about 50:50 isotridecyl ethoxylate with about 3 moles of ethylene oxide to isotridecyl ethoxylate with about 10 moles of ethylene oxide.

130. A composition consisting of:

a combination of non-ionic emulsifiers with anionic emulsifiers having an HLB effective to emulsify free hydrocarbons in media adapted to initiate acid reactive polymerization upon exposure to polymerziable silicate solution, wherein said anionic emulsifiers are selected from the group consisting of alkane sulfates, alkane sulfonates, and phosphate esters; and, said non-ionic emulsifiers are selected from the group consisting of polyoxyethylene alcohols.

131. The composition of claim 130 wherein said alkane sulfates, alkane sulfonates, and phosphate esters have from about 8 to about 18 carbon atoms; and said polyoxyethylene alcohols have from about 8 to about 30 carbon atoms and from about 3 to about 50 moles ethylene oxide.

132. The composition of claim 131 wherein said polyoxyethylene alcohols have from about 3 to about 20 moles ethylene oxide.

133. The composition of claim 132 wherein said combination is a blend of non-ionic emulsifier and anionic emulsifier at a weight ratio of about 50/50 to about 85/15.

134. The composition of claim 131 wherein said polyoxyethylene alcohols are selected from the group consisting of linear polyoxyethylene alcohols, polyoxyethylene alcohols having about 10 moles ethylene oxide, and a combination therefor.

135. The composition of claim 131 wherein said combination is a blend of non-ionic emulsifier and anionic emulsifier a weight ratio of about 50/50 to about 85/15.

136. The composition of claim 130 wherein said polyoxyethylene alcohols have from about 13 to about 15 carbon atoms.

137. The composition of claim 136 wherein said polyoxyethylene alcohols have from about 3 to about 20 moles ethylene oxide.

138. The composition of claim 137 wherein said alkane sulfates, alkane sulfonate, and phosphate esters have from about 8 to about 12 carbon atoms.

139. The composition of claim 136 wherein said polyoxyethylene alcohols are selected from the group consisting of linear polyoxyethylene alcohols, polyoxyethylene alcohols having about 10 moles ethylene oxide, and a combination therefor.

140. The composition of claim 139 wherein said combination is a blend of non-ionic emulsifier and anionic emulsifier at a weight ratio of about 50/50 to about 85/15.

141. The composition of claim 136 wherein said alkane sulfates, alkane sulfonates, and phosphate esters have from about 8 to about 12 carbon atoms.

142. The composition of claim 130 wherein said polyoxyethylene alcohols have from about 3 to about 20 moles ethylene oxide.

143. The composition of claim 142 wherein said combination is a blend of non-ionic emulsifier and anionic emulsifier at weight ratio of about 50/50 to about 85/15.

144. The composition of claim 142 wherein said alkane sulfates, alkane sulfonates, and phosphate esters have from about 8 to about 12 carbon atoms.

145. The composition of claim 130 wherein said polyoxyethylene alcohols are selected form the group consisting of linear polyoxyethylene alcohols, polyoxyethylene alcohols having about 10 moles ethylene oxide, and a combination thereof.

146. The composition of claim 130 wherein said combination is a blend of non-ionic emulsifier and anionic emulsifier at a weight ratio of about 50/50 to 85/15.

147. The composition of claim 146 with about 10 wt. % or less of said combination of said combination of non-ionic emulsifiers with anionic emulsifiers.

148. The composition of claim 130 wherein said alkane sulfates, alkane sulfonates, and phosphate esters have from about 8 to about 12 carbon atoms.

\* \* \* \* \*

UNITED STATES PATENT AND TRADEMARK OFFICE
CERTIFICATE OF CORRECTION

PATENT NO. : 6,838,485 B1
DATED : January 4, 2005
INVENTOR(S) : Quintero

It is certified that error appears in the above-identified patent and that said Letters Patent is hereby corrected as shown below:

Column 8,
Line 17, cancel the text beginning with "35. The A composition of claim 24" and insert the following -- 35. The composition of claim 24 --.

Column 13,
Line 29, cancel the text beginning with "118. The composition of emulsifying" and insert the following -- 118. A composition for emulsifying --.

Signed and Sealed this

First Day of March, 2005

JON W. DUDAS
*Director of the United States Patent and Trademark Office*